US012043579B2

(12) United States Patent
Wu

(10) Patent No.: US 12,043,579 B2
(45) Date of Patent: Jul. 23, 2024

(54) ONE STEP PROCESS OF MAKING SUSTAINABLE HYBRID MAGNESIUM CEMENT

(71) Applicant: Wayne State University, Detroit, MI (US)

(72) Inventor: Hwai-Chung Wu, Ann Arbor, MI (US)

(73) Assignee: Wayne State University, Detroit, MI (US)

( * ) Notice: Subject to any disclaimer, the term of this patent is extended or adjusted under 35 U.S.C. 154(b) by 450 days.

(21) Appl. No.: 17/234,131

(22) Filed: Apr. 19, 2021

(65) Prior Publication Data

US 2021/0323870 A1 Oct. 21, 2021

Related U.S. Application Data

(60) Provisional application No. 63/012,598, filed on Apr. 20, 2020.

(51) Int. Cl.
| | | |
|---|---|---|
| C04B 28/34 | (2006.01) |
| C04B 14/06 | (2006.01) |
| C04B 18/14 | (2006.01) |
| C04B 22/06 | (2006.01) |
| C04B 22/10 | (2006.01) |
| C04B 24/42 | (2006.01) |
| C04B 40/00 | (2006.01) |
| B28B 1/00 | (2006.01) |
| B28B 1/14 | (2006.01) |
| B33Y 70/00 | (2020.01) |
| C04B 103/10 | (2006.01) |
| C04B 111/00 | (2006.01) |

(52) U.S. Cl.
CPC ............ *C04B 28/344* (2013.01); *C04B 14/06* (2013.01); *C04B 18/146* (2013.01); *C04B 22/062* (2013.01); *C04B 22/10* (2013.01); *C04B 24/42* (2013.01); *C04B 40/0046* (2013.01); *B28B 1/001* (2013.01); *B28B 1/14* (2013.01); *B33Y 70/00* (2014.12); *C04B 2103/10* (2013.01); *C04B 2111/00172* (2013.01); *C04B 2111/00181* (2013.01)

(58) Field of Classification Search
CPC ..... C04B 28/344; C04B 14/06; C04B 18/146; C04B 22/062; C04B 22/10; C04B 24/42; C04B 40/0046
See application file for complete search history.

(56) References Cited

U.S. PATENT DOCUMENTS

| | | | |
|---|---|---|---|
| 9,212,093 B2 | 12/2015 | Wu et al. | |
| 10,150,700 B2 | 12/2018 | Wu et al. | |
| 2004/0204517 A1* | 10/2004 | Yamashita | .......... C04B 40/0039 524/2 |
| 2016/0102017 A1* | 4/2016 | Wu | .......... C04B 28/34 106/690 |
| 2018/0065888 A1* | 3/2018 | Donovan | ................ C04B 14/14 |

* cited by examiner

*Primary Examiner* — John E Uselding
(74) *Attorney, Agent, or Firm* — Fishman Stewart PLLC

(57) ABSTRACT

An exemplary process for forming a cured hybrid magnesium cement composition may include first combining a mixture of magnesium-containing material, a metal silicate inorganic polymer having a repeat unit of $SiP_2O_7$, and a salt having a non-metallic oxide anion, and then mixing the mixture with water.

21 Claims, 4 Drawing Sheets

|    | ppm    | %    |
|----|--------|------|
| Q4 | -109.4 | 1.7  |
| Q4 | -112.5 | 2.9  |
| Q4 | -112.5 | 8.0  |
| Q4 | -116.8 | 3.3  |
| Q4 | -119.9 | 1.5  |
| Q2 | -84.9  | 82.6 |

|    | ppm    | %    |
|----|--------|------|
| Q4 | -111.4 | 1.0  |
| Q2 | -85.2  | 99.0 |

|    | ppm    | %    |
|----|--------|------|
| Q4 | -107.6 | 8.2  |
| Q4 | -110.6 | 5.3  |
| Q4 | -112.0 | 7.1  |
| Q4 | -114.8 | 1.2  |
| Q2 | -85.2  | 78.3 | ns
ONE STEP PROCESS OF MAKING SUSTAINABLE HYBRID MAGNESIUM CEMENT

CROSS-REFERENCE TO RELATED APPLICATIONS

This application claims priority to U.S. Provisional Patent application No. 63/012,598, filed on Apr. 20, 2020, the contents of which are incorporated herein in their entirety.

TECHNICAL FIELD

This disclosure relates generally to a cured hybrid magnesium cement composition and a one-step process of making a cured hybrid magnesium cement composition.

BACKGROUND

Portland cement has been used in concrete for newly two centuries. However, Portland cement generally requires energy-intensive production facilities sufficient to process limestone at 2,000° F. in mammoth kilns. About one pound of carbon dioxide is released to the atmosphere for every pound of Portland cement produced. While Portland cement is used in many concrete structures, Portland cement also contributes significantly to decay of installed infrastructure as Portland cement deteriorates, especially due to attack from chloride ions.

Magnesium cement is suitable as a substitute for Portland cement. At present, magnesium cements are derived from magnesium oxide and are therefore relatively costly and relatively complicated products. Marketed products involving magnesium cement are primarily limited to the interior boards. Magnesium oxychloride cement experiences a strength loss when wet as a result of leaching of magnesium chloride and other chloride components. Another magnesium cement, magnesium oxysulfate cement, also loses strength when wet because it still has a relatively significant magnesium chloride component. Such strength reduction is a major obstacle to other structural uses of magnesium cement. Other magnesium cements provide high performance, but have limited raw material supplies, cannot be wet-cured, and are otherwise ten-fold more expensive than Portland cement.

Hybrid magnesium cements (HMC) is an improved alternative to Portland cement as a more sustainable material having superior mechanical properties and duty life, especially in wet duty service, while being reasonably priced. Processes have been developed for making sustainable HMC from low cost magnesium rich minerals (e.g., dolomite, pyroxenite, amphibolites, serpentine, dunite, and chlorite) and metal silicates (e.g., slag, coal ash, bio-mass ash, and tailings). However, such processes involve two-steps of first mixing separately magnesium components and silicate components, then mixing the two parts together. Hence, these processes may be time and labor intensive, and inconvenient on typical job sites.

Thus, there is a need to develop an improved sustainable HMC and process for making said HMC that address the aforementioned challenges or shortcomings.

DETAILED DESCRIPTION

Figures 1A, 1B:
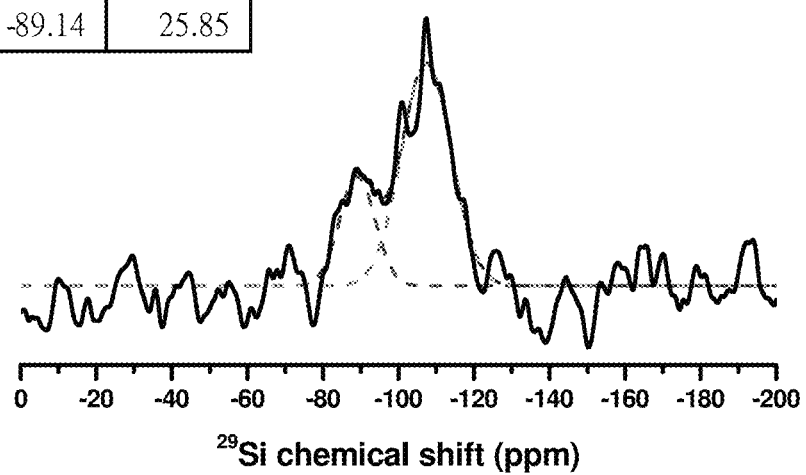
FIGS. 1A and 1B illustrate results of an NMR analysis for a typical OPC mortar.

Except in examples, or where otherwise expressly indicated, all numerical quantities in this description used to indicate amounts of material or dimensions are to be understood as modified by the word "about" or similar terminology in describing the broadest scope of the invention.

Hybrid magnesium cements (HMC), a better alternative to Portland cement, may be produced from low cost minerals and waste materials, such as slag, coal ash, bio-mass ash, or mine tailings. Waste materials and active mineral components can be calcined at much lower temperatures than those of Portland cement. HMC is energy efficient and emits much less $CO_2$ from their production. Key issues may include optimal ranges of hybrid mix compositions, processing, and curing conditions. Standard HMC mix can achieve high early strength within several hours leading to much improved construction speed and construction ease. Modified HMC can also be tailored to possess various set times so that longer work times are guaranteed as needed. HMC concrete structures also have a significant absorption capability of ambient $CO_2$ by the carbonation process. Compared to Portland cement, HMC has significantly higher ductility. These unique characteristics of HMC renders HMC concrete structures much improved crack resistant, leading to prolonged service life of such structures.

According to teachings of the present disclosure, an exemplary cured hybrid magnesium cement (HMC) composition may include a magnesium-containing material, a metal silicate inorganic polymer having a repeat unit of $SiP_2O_7$, and a salt having a non-metallic oxide anion.

In embodiments, the magnesium-containing material may include calcium carbonate in the amount from 0 wt. % to 70 wt. % of the magnesium-containing material, calcium oxide in the less than 10% of the magnesium-containing material, magnesium carbonate in the amount of 0 wt. % to 25 wt. % of the magnesium-containing material, and/or magnesium oxide in the amount from 18 wt. % to 70 wt. % of the magnesium-containing material. In addition or alternatively, the magnesium-containing material may be a light-burn, hard-burn or dead-burn grade magnesite, dolomite, pyroxenite, amphibolite, serpentine, dunite, or chlorite having a weight loss ranging from 23-28 dry wt. % relative to an uncalcined magnesium-containing material as measured by weighing the dry magnesium-containing material after calcining relative to before calcining.

With embodiments, the exemplary cured HMC composition may include hydraulic additives, activators, water, and/or sand. For example and without limitation, the hydraulic additive may include a ground granulated blast-furnace slag and/or the cement activator source may include at least one of a free lime, a hydrated lime, an alkali hydroxide, a sodium sulfate, and a sodium carbonate. The exemplary HMC composition may further include as a silicate source calcium silicate and/or aluminate silicate. Additionally or alternatively, the silicate source may include at least one of a metakaolin, fly ash, slag, biomass ash and bottom ash.

In embodiments, the salt of the exemplary cured HMC composition may be or may include a phosphate salt, for example and without limitation, a phosphate salt capable of being solubilized in an amount ranging from 1.5 wt. % to 11 wt. % on a dry weight basis.

In embodiments, the exemplary cured HMC composition may further include magnesium oxide. For example and without limitation, a weight ratio of the salt (which may be referred to as a phosphate salt) to magnesium oxide may range from 0.1 to 1.2.

With embodiments, metal silicate inorganic polymer of the exemplary may have at least 60 repeat units of $SiP_2O_7$. Further, the metal silicate inorganic polymer may be formed during the curing of the HMC composition.

In embodiments, the exemplary cure HMC composition may further include a silicone resin where the R—SiO siloxane-oxygen resin polymer may range from 0.03 wgt. % to 5 wgt. % and/or may contain at least 40 wgt. % $SiO_2$, where the R represents a phenol:methyl ratio of 0.6:1, a molecular weight of <5,000 daltons and a Tg between 40° C. and 70° C. Silicone resins may be polymers comprising a silicon-oxygen lattice with a portion comprising Si—$O_2$ and R—SiO structures, where R represents an alkyl and aryl organic group, for example methyl or phenyl. With the addition of the alkyl and aryl R group, the siloxane polymer may become more linear, which may increase the flexibility of the silicone.

Examples of traditional two-step processes and one-step processes for making and testing a cured HMC composition according to the present disclosure are provided below for comparison purposes. The processes are provided as examples and are not intended to be limiting. Other processes, including the compositions, concentrations, materials, and the like used therein that do not fall within the examples but that are in accordance with the above description are contemplated as part of the present invention.

Example 1

A sample magnesium-containing cement mortar is prepared with 1 part magnesium oxide, 0.45 parts ground granulated blast furnace slag (GGBFS), and 0.3 parts dipotassium phosphate. A sample of a metal silicate polymer is prepared with 1 part GGBFS, 0.125 parts Class F fly ash, 0.1 parts sodium carbonate, and 0.05 parts free lime. Between the magnesium-containing cement mortar and the metal silicate polymer, 2.7 parts of sand, 0.125 parts of silica fume, and 1.02 parts of water are dispersed. The magnesium-containing cement mortar and the metal silicate polymer are separately mixed for 2 minutes. Then, the two mixtures are mixed thoroughly forming a hybrid magnesium-containing cement sample composition. The hydration mechanism is not fully understood in this case, but is known to be different than the hydration mechanism of Portland cement.

Example 2

The composition of Example 1 is cast into 3 inch in diameter×6 inch in height cylindrical molds. The samples are demolded after 24 hours. After 28 days, the compressive strength is measured at 2579 psi when tested to failure according to test method ASTM C39.

Example 3

The dry components of the same mix composition of Example 1 are mixed thoroughly in one step for 2 minutes. Then the same amounts of water as Example 1 is added and mixed for two minutes forming a hybrid magnesium-containing cement sample composition.

Example 4

The composition of Example 3 is cast into 3 inch in diameter×6 inch in height cylindrical molds. The samples are demolded after 24 hours. After 28 days, the compressive strength is measured at 2876 psi when tested to failure according to test method ASTM C39.

Example 5

A sample magnesium-containing cement mortar is prepared with 1 part magnesium oxide, 0.45 parts ground granulated blast furnace slag (GGBFS), 0.1 parts dipotassium phosphate, and 0.03 parts linear silicon polymer that contains 63 wt. % $SiO_2$, a phenol:methyl ratio of 0.6:1, a molecular weight between 2,000 and 4,000 daltons and a Tg of between 41° C. and 70° C. (Dowsil RSN0249 by Dow). A sample of a metal silicate polymer is prepared with 1 part GGBFS, 0.125 parts Class F fly ash, 0.1 parts sodium carbonate, and 0.05 parts free lime. Between the magnesium-containing cement mortar and the metal silicate polymer, 2.7 parts of sand, 0.125 parts of silica fume, and 1.02 parts of water are dispersed. The magnesium-containing cement mortar and the metal silicate polymer are mixed thoroughly for 4 minutes forming a hybrid magnesium-containing cement sample composition (in the same way of Example 3).

Example 6

The composition of Example 5 is cast into 3 inch in diameter×6 inch in height cylindrical molds. The samples are demolded after 24 hours. After 28 days, the compressive strength is measured at 2269 psi when tested to failure according to test method ASTM C39.

Example 7

A hybrid sample is prepared with 1 part magnesium oxide, 1.45 parts ground granulated blast furnace slag (GGBFS), 0.32 parts silica fume, 0.125 parts Class F fly ash, 0.3 parts dipotassium phosphate, 0.1 parts sodium carbonate, 0.05 parts hydrated lime, 1.36 parts of sand, and 1.58 parts of water. All components are mixed thoroughly for 4 minutes forming a hybrid magnesium-containing cement sample composition.

Example 8

The composition of Example 7 is cast into 40 mm×40 mm×40 mm cubic molds. The samples are demolded after 24 hours. After 1 day and 7 days, the compressive strength is measured at 807 psi and 4762 psi respectively when tested to failure according to test method ASTM C109.

Example 9

A hybrid sample is prepared with 1 part magnesium oxide, 1.1 parts ground granulated blast furnace slag (GGBFS), 0.32 parts silica fume, 0.125 parts Class F fly ash, 0.3 parts dipotassium phosphate, 0.1 parts sodium carbonate, 0.05 parts hydrated lime, 1.6 parts of sand, and 1.56 parts of water. All components are mixed thoroughly for 4 minutes forming a hybrid magnesium-containing cement sample composition.

Example 10

The composition of Example 9 is cast into 40 mm×40 mm×40 mm cubic molds. The samples are demolded after 24 hours. After 1 day and 7 days, the compressive strength is measured at 980 psi and 3864 psi respectively when tested to failure according to test method ASTM C109.

Figures 2A, 2B:
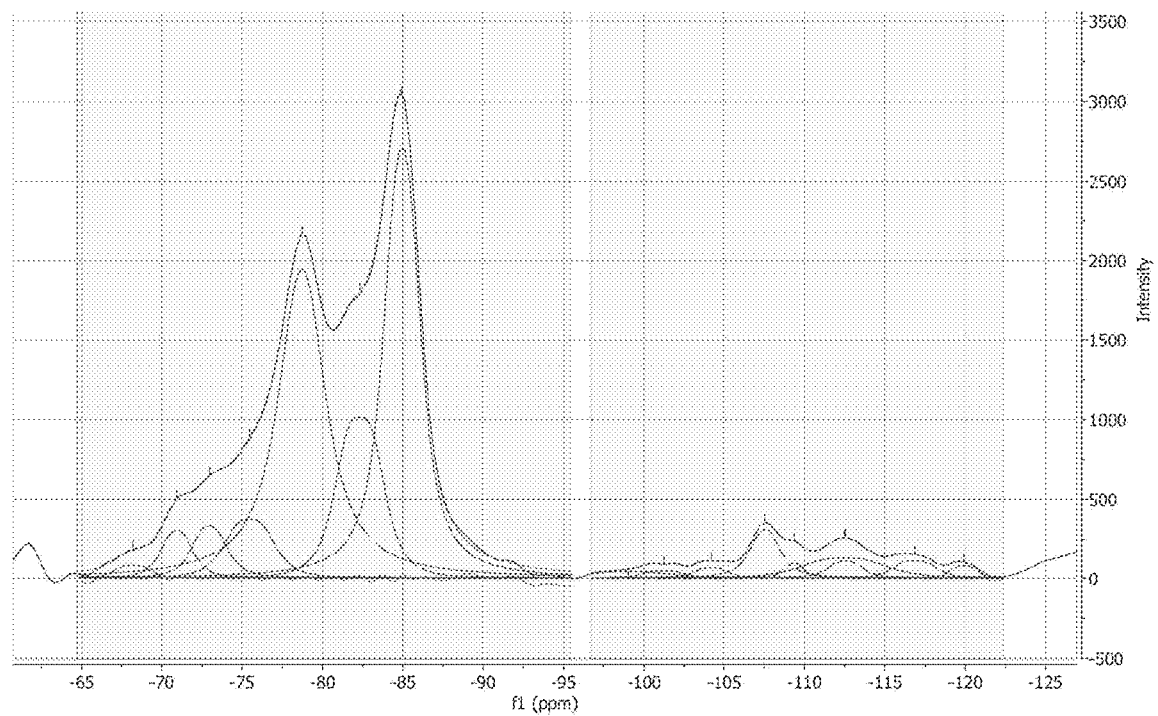
FIGS. 2A and 2B illustrate results of an NMR analysis for one exemplary HMC composition according to teachings of the present disclosure.
Figures 3A, 3B:
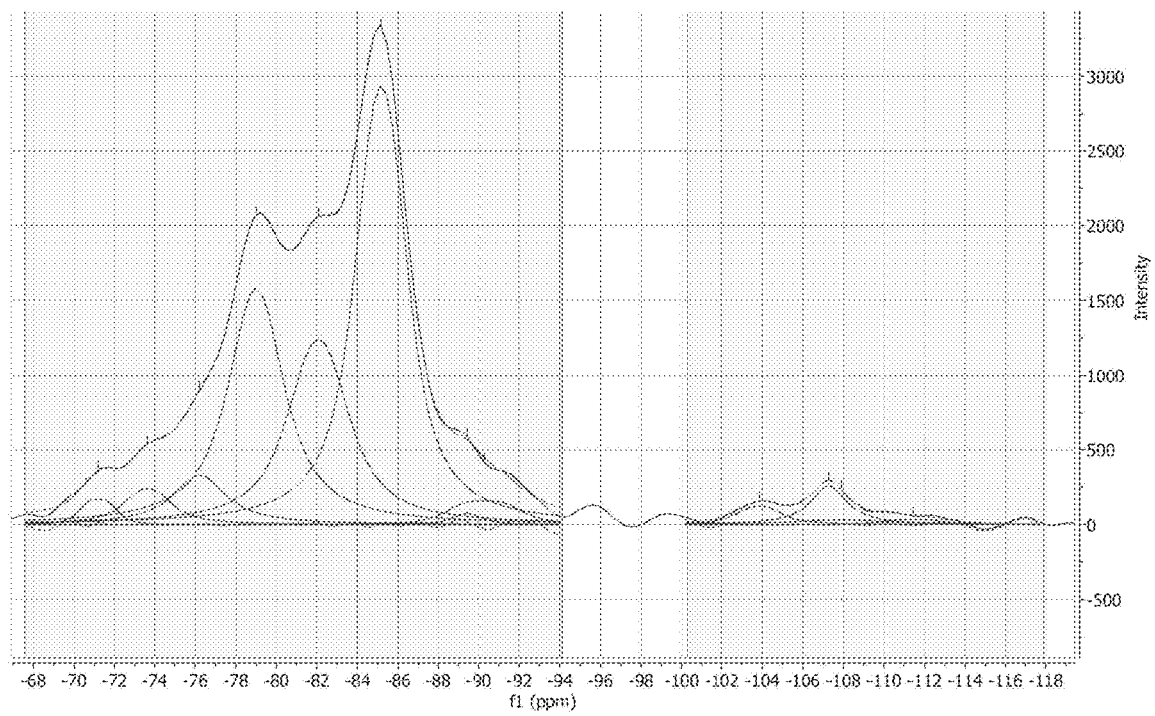
FIGS. 3A and 3B illustrate results of an NMR analysis for another exemplary HMC composition according to teachings of the present disclosure.
Figures 4A, 4B:
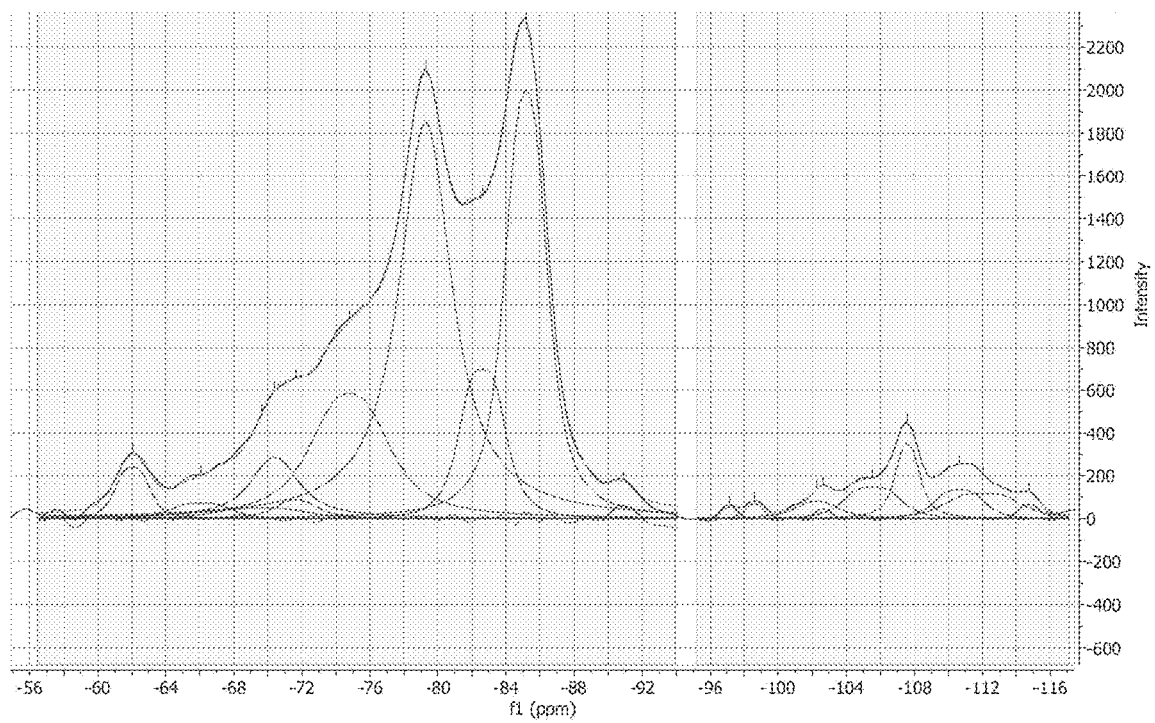
FIGS. 4A and 4B illustrate results of an NMR analysis for another exemplary HMC composition according to teachings of the present disclosure.

The results of NMR analyses for different HMC compositions are set forth in the figures. FIGS. 1A and 1B illustrate the $^{29}Si$ magic-angle spinning (MAS) spectra acquired for a regular OPC mortar. FIGS. 2A and 2B illustrate the $^{29}Si$ MAS spectra acquired for the composition of Example 1, which serves as a control example from U.S. Pat. No. 10,150,700. FIGS. 3A and 3B illustrate the $^{29}Si$ MAS spectra acquired for the composition of Example 3. FIGS. 4A and 4B illustrate the $^{29}Si$ MAS spectra acquired for the composition of Example 5, in which a linear silicate phosphate is used. $^{29}Si$ MAS NMR is a well-known spectroscopic method for the characterization of the silicon species with different number of bridging oxygens ($Q^n$). For the OPC mortar, the majority of the silicon species exist as $Q^4$ (74%) and the rest as $Q^2$ (26%). In other words, most of the silicon species are tetrahedrally coordinated, which form the basic units of the structural network in the cement. On the other hand, the composition of Example 1 reveals that most of the silicon species exist as $Q^2$ (82.6%), which implies that most of the silicon atoms have only two bridging oxygens. Similarly, $Q^2$ of Example 3 is 99%, and $Q^2$ is 78.3% for Example 5. The figures illustrate the presence of linearly polymerized silicon species ($Q^2$) in the exemplary embodiments.

In another example, the composition may include the following:

| Part A | | |
| --- | --- | --- |
| | % | Grams |
| FA-O | 0.0% | 0 |
| FA-B | 5.6% | 505 |
| Slag | 18.6% | 1677 |
| Silica Fume | 0.0% | 0 |
| Sand | 35.2% | 3173 |
| NaOH | 0.0% | 0 |
| OPC | 7.4% | 667 |
| Na2SO4 | 0.7% | 63 |
| K3PO4 | 1.9% | 171 |
| MgO | 18.6% | 1677 |
| Water | 0.0% | 0 |
| Total | 88.0% | 7932 |

| Part B | | |
| --- | --- | --- |
| | % | Grams |
| Slag | 0.0% | 0 |
| Sand | 0.0% | 0 |
| MgO | 0.0% | 0 |
| K3PO4 | 0.0% | 0 |
| Na2SO4 | 0.0% | 0 |
| Water | 12.0% | 1082 |
| Total | 12.0% | 1082 |

While embodiments of the invention have been described, it is not intended that these embodiments illustrate and describe all possible forms of the invention. Rather, the words used in the specification are words of description rather than limitation, and it is understood that various changes may be made without departing from the spirit and scope of the invention.

When introducing elements of various embodiments of the disclosed materials, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description, but is only limited by the scope of the appended claims.

What is claimed is:

1. A process for forming a cured hybrid magnesium cement (HMC) composition, the process comprising:
   combining together in one step a mixture of magnesium-containing material, a metal silicate inorganic polymer having a repeat unit of $SiP_2O_7$, and a salt having a non-metallic oxide anion; and
   then adding water and mixing the mixture with water.

2. The process of claim 1, further comprising adding hydraulic additives, activators, linear silicon polymer, and/or sand.

3. The process of claim 1, wherein the magnesium-containing material includes calcium carbonate in the amount from 0 wt. % to 70 wt. % of the magnesium-containing material, calcium oxide in the less than 10% of the magnesium-containing material, magnesium carbonate in the amount of 0 wt. % to 25 wt. % of the magnesium-containing material, and magnesium oxide in the amount from 18 wt. % to 70 wt. % of the magnesium-containing material.

4. The process of claim 1, wherein the magnesium-containing material is a light-burn, hard-burn or dead-burn grade magnesite, dolomite, pyroxenite, amphibolite, serpentine, dunite, or chlorite having a weight loss ranging from 23-28 dry wt. % relative to an uncalcined magnesium-containing material as measured by weighing the dry magnesium-containing material after calcining relative to before calcining.

5. The process of claim 2, wherein the hydraulic additive includes a ground granulated blast-furnace slag.

6. The process of claim 2, further comprising adding a silicate source including calcium silicates and calcium aluminate silicate.

7. The process of claim 2, comprising adding a silicate source including at least one of a metakaolin, fly ash, slag, biomass ash and bottom ash.

8. The process of claim 1, wherein the salt is a phosphate salt capable of being solubilized in water, the phosphate salt provided in the amount ranging from 1.5 wt. % to 11 wt. % on a dry weight basis.

9. The process of claim 1, further comprising adding magnesium oxide, wherein a weight ratio of the salt to magnesium oxide ranges from 0.1 to 1.2.

10. The process of claim 1, wherein the magnesium-containing material composition includes a light-burn, hard-burn, or dead-burn grade magnesite and a salt having a non-metal oxide anion.

11. The process of claim 1, comprising adding a cement activator source including at least one of a free lime, hydrated lime, alkali hydroxide, sodium sulfate and sodium carbonate.

12. The process of claim 1, wherein the metal silicate inorganic polymer has at least 60 repeat units of $SiP_2O_7$.

13. The process of claim 1, comprising adding a linear silicon polymer including at least one silicone resin polymer comprising a siloxane-oxygen structure R—SiO, where R represents alkyl and aryl organic groups.

14. The process of claim 13, wherein the R—SiO siloxane-oxygen resin polymer ranges from 0.03 wgt. % to 5 wgt. % and contains at least 40 wgt. % $SiO_2$, where the R represents a phenol:methyl ratio of 0.6:1, a molecular weight of <5,000 daltons and a Tg between 40° C. and 70° C.

15. A process comprising:
first mixing together in one step a mixture of a magnesium-containing material, a metal silicate polymer, a salt having a non-metallic oxide anion, and one or more of a linear silicone polymer, a hydraulic additive, a cement activator, and sand; and
then mixing water with the mixture to form a cured hybrid magnesium cement (HMC) composition.

16. The process of claim 15, further comprising spraying, shotcreting, 3D printing, or casting the HMC composition into at least one mold.

17. The process of claim 16, further comprising testing the HMC composition to failure, and measuring at least one of a compressive strength, a flexural strength, and a tensile strength of the HMC composition.

18. The process of claim 15, wherein the magnesium-containing material includes at least magnesium oxide.

19. The process of claim 15, wherein the salt is a dipotassium phosphate.

20. A process for forming a cured hybrid magnesium cement (HMC) composition, the process comprising:
combining together a mixture of magnesium-containing material, a metal silicate inorganic polymer having a repeat unit of $SiP_2O_7$, and a salt having a non-metallic oxide anion;
mixing the mixture with water;
adding a linear silicon polymer including at least one silicone resin polymer comprising a siloxane-oxygen structure R—SiO, where R represents alkyl and aryl organic groups, wherein the R—SiO siloxane-oxygen resin polymer ranges from 0.03 wgt. % to 5 wgt. % and contains at least 40 wgt. % $SiO_2$, where the R represents a phenol:methyl ratio of 0.6:1, a molecular weight of <5,000 daltons and a Tg between 40° C. and 70° C.

21. The process of claim 20, wherein the linear silicon polymer is added to the mixture in one step together with the magnesium-containing material, the metal silicate inorganic polymer, and the salt before adding water to the mixture.

* * * * *